Figure 1:
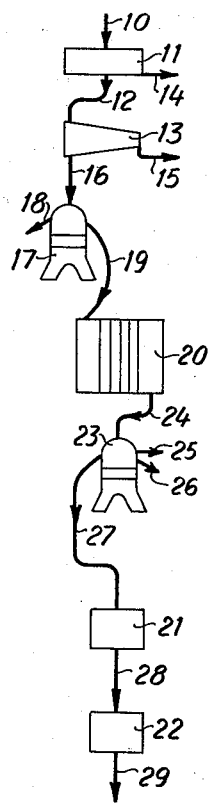

May 26, 1959

A. E. G. BORCK 2,888,449

METHOD AND PLANT FOR THE RECOVERY OF OIL
AND PROTEINS FROM ANIMAL MATERIAL
Filed Dec. 15, 1955

INVENTOR.
Alfred Erwin Gerhard Borck
BY
Davis, Hoxie & Faithfull
ATTORNEYS

2,888,449

METHOD AND PLANT FOR THE RECOVERY OF OIL AND PROTEINS FROM ANIMAL MATERIAL

Alfred Erwin Gerhard Borck, Tullinge, Sweden, assignor to Aktiebolaget Separator, Stockholm, Sweden, a corporation of Sweden Application December 15, 1955, Serial No. 553,349

Claims priority, application Sweden December 22, 1954

8 Claims. (Cl. 260—112)

This invention relates to an improved method and a plant for recovering oil and proteins from animal material.

Various methods have been used for recovering oil and proteins from animal material, such as herring and other marine animals. Common to all the methods is that the raw material, with or without cooking and before or after cooking, is disintegrated and is then subjected to a pressing operation. In this way the material is freed from the main part of the solid substances, and a liquid (the so-called press water) is obtained, this liquid being the raw product to be treated for the recovery of oils and proteins.

The press liquid consists of water, oil, proteins which are partly dissolved and partly undissolved in the liquid, and some residual sludge. Oil should here be understood to include fat.

At an early stage of the art of treating animal material, only the recovery of oil or fat was of interest; and this was done by freeing the press water, in a first operation, from sludge, and thereupon, in a second operation, from the oil or fat which was recovered for further treatment. The rest of the liquid, containing water and dissolved or undissolved proteins, was discarded as being useless.

In recent times, however, it has been found that the proteins are valuable, for instance, as fodder. Accordingly, the proteins have been recovered by evaporating the residual liquid which contains the proteins. The evaporation can be carried far enough to provide a completely dry substance, or it can be interrupted at an earlier stage. In the latter case, the product still moist is usually mixed with other substances which absorb the moisture and thereby give a practically dry commercial product.

In the recovery of the oil and the proteins, it is known to operate according to two methods. These methods are hereinafter referred to as A and B, respectively, and when compared they are assumed to be applied to apparatus which have one and the same capacity in respect of throughput per hour of raw material.

In method A, the press water is first freed in a conventional manner from the main part of the sludge and is thereupon subjected to a separation in a centrifuge for removal of oil, whereupon the rest of the press liquid, which now is usually called glue water, is subjected to evaporation in three stages.

In method B, the press water is first freed in a conventional manner from the main part of the sludge but is thereupon subjected to an evaporation in a first stage. It is only after this initial evaporation that a separation in a centrifuge for removal of the oil takes place, whereupon the glue water thus obtained is subjected to continued evaporation in two successive stages.

The difference between method A and method B, therefore, is that in method A the oil is separated before while in method B it is separated after its passage through the first stage of the evaporator. In both cases, an evaporator of the so-called tube type (i.e., evaporating apparatus of the tube condenser type) is used, in which the liquid to be evaporated passes through the tubes and the heating medium passes outside the tubes. In both cases, it is common to use three evaporators in series, although a different number can be used in series.

In method A, assuming a certain capacity of the plant, 14 oil centrifuges working in parallel are required and an oil of good quality is obtained; while in method B, assuming the same capacity, only 7 oil centrifuges are required but the oil obtained is of a quality inferior to that obtained by method A. The inferior oil quality results from the fact that in method B the oil passing through the first stage of the evaporator is subjected to a heating which impairs the quality, which sometimes is further impaired by "burning on" in the evaporator.

Method A as well as method B have the disadvantage that neither the sludge removal nor the oil removal is complete, but part of the sludge and oil accompanies the phase passing through the evaporators, which lowers the value of the protein product obtained. Further, the evaporator of the first stage is highly exposed to precipitations of sludge and calcium salts and other impurities on the heat surfaces, which requires frequent cleaning and entails interruptions in the operation, because the apparatus cannot be cleaned unless the operation is stopped.

All these disadvantages are eliminated by the present invention. According to the invention, assuming a plant for the same capacity as in cases A and B, the press water first is freed in a conventional manner from sludge, and the rest of the press water is then freed from oil by means of centrifugal separation using a smaller number of centrifugal separators (i.e., less than 14 in the case stated). These centrifugal separators are of a type which provides a better quality of the separated oil than is obtained from method A, which means in turn that more oil than in method A is allowed to follow the glue water to the evaporators. Thereupon, evaporation is effected in a multi-stage evaporator, the first stage of which consists of a so-called plate apparatus, this multi-stage evaporator being provided, between some of the stages, with a centrifugal separator for removal of sludge and oil, respectively.

A plant made according to the invention can be operated for longer periods of time without being shut down for cleaning, because the plate apparatus, being provided with smooth surfaces, is not as susceptible as a tube to acquiring precipitations which disturb the operation. Moreover, the plate apparatus by its nature can be composed of a plurality of separate sections which can be connected either in series or in parallel by simple arrangements, so that it is possible by simple means, and whenever desired, to put aside a section for cleaning by flushing with a flushing liquid, without it being necessary to interrupt the operation for this purpose. Also, it is possible to recover all the oil separated from the other products, whereby the quality of the final product of the evaporated proteins is improved, which means that this product can command a better price. Of course, the oil separated after the initial separation is of a lower quality than the oil obtained in the first separation; but overall the plant of the present invention can be operated at greater profit than has been possible heretofore.

According to the invention, a centrifugal separator for sludge can be placed between the first and second stages of the evaporator, and a centrifugal separator for oil can be placed between its second and third stages. According to a second alternative, first a centrifugal separator for sludge and then one for oil can be arranged in series between the first and second stages of the evoporator; and according to a third alternative, the two latter centrifugal separators can be replaced by a single separator for separating individually both sludge and oil from the glue water.

Figure 2:
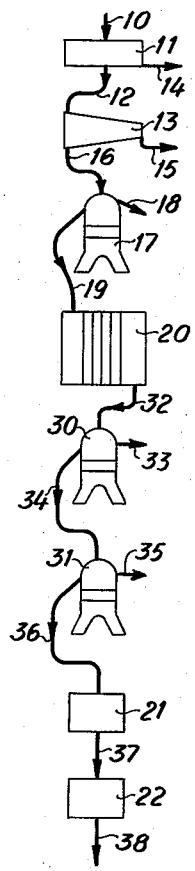
Figure 3:
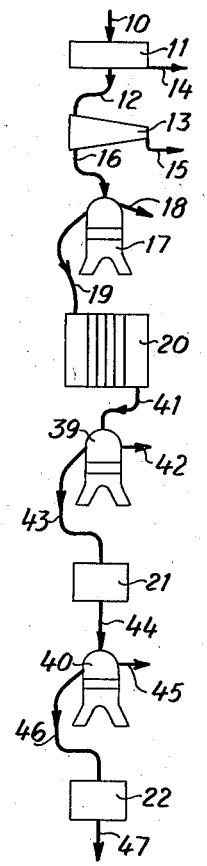

The invention is illustrated diagrammatically in the accompanying drawing, in which Figs. 1, 2, and 3 show different examples of some of its embodiments.

The plants illustrated in Figs. 1, 2 and 3 are alike in many respects and therefore they are first described with respect to the like parts, which have been given the same reference characters.

The material which has been cut into pieces or pre-treated in other respects is fed through a pipe 10 into a press 11, from which the press liquid passes through a pipe 12 to a centrifugal separator 13, while solid substance coming from the raw material (usually animal material of marine animals, e. g. herring) is discharged from the plant through a pipe 14. In the centrifuge 13, sludge is separated from the press liquid and is discharged from the plant through the pipe 15, while the rest of the press liquid or the so-called press water is passed on through a pipe 16 to a centrifugal separator 17. The latter separator is of a conventional type adapted for separation of only a part, but the main part, of oil and fat from the press water. This separated oil or fat will thus be of high quality and leaves the plant through the pipe 18, while the rest of the press water passes through the pipe 19 to an evaporator divided into three stages 20, 21 and 22. The first stage 20 of the evaporator consists of a conventional plate apparatus, that is, a plate type of heat exchanger. The stages of the evaporator are provided with the usual means for separately feeding and discharging the heating medium and for discharge of evaporated steam, but in order not to complicate the drawing unnecessarily, they are not illustrated here.

According to Fig. 1, a centrifugal separator 23 is placed between the first stage 20 and second stage 21 of tht evaporator, to which separator press water is supplied through the pipe 24. The centrifuge 23 is of a conventional type adapted to discharge sludge through a pipe 25 and oil through a pipe 26 leading from the plant, this oil being of a lower quality than that discharged at 18. The rest of the press water or the so-called glue water is led through a pipe 27 to the second stage 21 of the evaporator, from which it is led through the pipe 28 to the third stage 22, the evaporated glue water being finally discharged from the plant through the pipe 29. The evaporated glue water leaving through the pipe 29 may be in the form of powder or a liquid concentrate. In the case of a liquid concentrate, the latter can be subjected to a subsequent treatment wherein it is absorbed by another product and thereby becomes a practically dry commercial product.

According to Fig. 2, two series-connected centrifugal separators 30 and 31 are placed between the first stage 20 and the second stage 21 of the evaporator. The press liquid from the evaporator 20 is passed through a pipe 32 to the centrifuge 30, in which sludge is discharged from the plant through a pipe 33, while the rest of the press water is led through a pipe 34 to the centrifuge 31 in which oil is separated out and discharged from the plant through a pipe 35. The rest of the press water (the glue water) is led through a pipe 36 to the second stage 21 of the evaporator and from there through a pipe 37 to the third stage 22, from which it is discharged through a pipe 38 corresponding to the pipe 29 in Fig. 1. The centrifuges 30 and 31 can, if desired, be interchanged.

According to Fig. 3, centrifugal separators 39 and 40 are placed between the first and the second stages 20—21 of the evaporator and between the second and third stages 21—22, respectively. Press water from the evaporator 20 is supplied to the centrifuge 39 through a pipe 41, and in this centrifuge sludge is separated and discharged from the plant through a pipe 42, while the rest of the press water is led through a pipe 43 to the evaporator 21. From the latter, the press liquid passes through a pipe 44 to the centrifuge 40 in which oil is separated out and discharged from the plant through a pipe 45, while the rest of the press water (the glue water) is led through a pipe 46 to the third stage 22 of the evaporator. There, after further evaporation, it is discharged through a pipe 47 corresponding to the pipes 29 and 38 in Figs. 1 and 2, respectively. The centrifuges 39 and 40 may, if desired, be interchanged.

In a plant made according to the invention, as described, all the oil from the raw material is recovered, the main part being of very high quality and a smaller part being of lower quality. Moreover, all solid substances and all the sludge are removed from the process, so as to provide for the evaporation of glue water which is free from solid substances, sludge and oil. This results in an evaporated protein product of very high quality. The product is judged according to its oil content and is considered better the less oil it contains. Another advantage of the new plant is that these results are attained by using a smaller number of centrifugal separators than has been required heretofore, this advantage stemming from the fact that prior to the first stage of the evaporation the amount of oil separated out is smaller than has been the case heretofore, although it is the main part of it, and that the rest of the oil as well as sludge is removed between two stages of the evaporator. Finally, there is a special advantage in using a plate apparatus as the first stage of the evaporation. The latter is provided throughout with smooth surfaces which are easy to clean; and it can be made of sections of plate packs which may be connected and disconnected from the system by simple hand movements, whereby a disconnected section can be easily cleaned by flushing while another section is in operation, so that no interruption for cleaning the first stage of the evaporator is necessary. This is of very great importance because in the new plant a large part of oil is allowed to follow the press water through the first stage of the evaporator, and if this stage cannot be kept clean during continuous operation by means of repeated flushing operations, the oil is spoiled by "burning on" or in other ways, so that its quality decreases considerably. Moreover, the efficiency of the evaporation is reduced by precipitations, particularly in the first evaporator, and if the latter cannot be kept clean for a long period of continuous operation, the throughput of the plant decreases progressively. In the subsequent stages of the evaporator, the risk of precipitations on the walls is considerably smaller.

I claim:

1. In the recovery of oil and proteins from press water obtained from animal material, the method which comprises passing the press water through a first centrifugal separating operation and there separating sludge from the press water, passing the separated press water with remaining sludge through a second centrifugal separating operation and there freeing it from part but not all of its oil content, subjecting the resulting press water and remaining oil from said second separating operation to a first stage of evaporation, passing the partially concentrated press water from said first evaporation stage through subsequent stages of evaporation, and, during passage of the partially concentrated press water between the first and last evaporation stages, centrifuging it to remove sludge and oil separately therefrom.

2. The method according to claim 1, wherein said last centrifuging takes place between the first and second evaporation stages in one separating operation from which sludge, oil and glue water are separately discharged, the glue water being passed to the second evaporation stage.

3. The method according to claim 1, wherein said last centrifuging takes place between the first and second evaporation stages and includes two successive centrifuging operations, one of which removes sludge and the other of which removes oil from the press water, the residual press water being passed as glue water to the second evaporation stage.

4. The method according to claim 1, wherein said last centrifuging includes two separate centrifuging operations which take place between the first and second and the second and third evaporation stages, respectively, one of said last two centrifuging operations removing sludge and the other removing oil from the press water, the residual press water being passed as glue water from the second of said last two operations to the third evaporation stage.

5. A system of the character described for recovering proteins from press water, which comprises a pair of series-connected centrifugal separators, one of said separators being adapted to separate sludge and the other to separate only part of the oil from said water, a multi-stage evaporator connected to receive press water from the second of said separators, the evaporator including a plate apparatus forming the first evaporation stage and centrifugal separating means located between two stages of the evaporator and operable to remove oil and sludge separately from the press water.

6. A system according to claim 5, in which said centrifugal separating means include a single centrifuge connected between the first and second evaporation stages and having separate discharge lines for oil and sludge, respectively, said centrifuge also having a press water discharge line leading to the second evaporation stage.

7. A system according to claim 5, in which said centrifugal separating means include two centrifuges connected in series between the first and second evaporation stages, one of said last centrifuges being operable to remove sludge and the other to remove oil from the press water.

8. A system according to claim 5, in which said centrifgual separating means include two centrifuges connected between the first and second evaporation stages and between the second and third evaporation stages, respectively, one of said last centrifuges being operable to remove sludge and the other to remove oil from the press water.

References Cited in the file of this patent

UNITED STATES PATENTS

| | | |
|---|---|---|
| 219,667 | Alsing | Sept. 16, 1879 |
| 2,230,196 | Clayton | Jan. 28, 1941 |
| 2,562,739 | Risberg | July 31, 1951 |
| 2,590,303 | Fladmark | Mar. 25, 1952 |

FOREIGN PATENTS

| | | |
|---|---|---|
| 513,177 | Canada | May 24, 1955 |